US 11,460,588 B2

(12) United States Patent
Zhang et al.

(10) Patent No.: US 11,460,588 B2
(45) Date of Patent: Oct. 4, 2022

(54) METHOD AND SYSTEM FOR REAL-TIME HIGH-PRECISION POSITIONING IN DEEP SEA

(71) Applicant: National Deep Sea Center, Qingdao (CN)

(72) Inventors: Tongwei Zhang, Qingdao (CN); Shengjie Qin, Qingdao (CN); Xiangxin Wang, Qingdao (CN); Jialing Tang, Qingdao (CN); Dequan Lu, Qingdao (CN); Zhengguang Li, Qingdao (CN)

(73) Assignee: National Deep Sea Center, Qingdao (CN)

( * ) Notice: Subject to any disclaimer, the term of this patent is extended or adjusted under 35 U.S.C. 154(b) by 541 days.

(21) Appl. No.: 16/525,923

(22) Filed: Jul. 30, 2019

(65) Prior Publication Data
US 2020/0041659 A1 Feb. 6, 2020

(30) Foreign Application Priority Data
Aug. 3, 2018 (CN) .......................... 201810877548.2

(51) Int. Cl.
G01S 19/45 (2010.01)
G01S 5/30 (2006.01)

(52) U.S. Cl.
CPC ............... G01S 19/45 (2013.01); G01S 5/30 (2013.01)

(58) Field of Classification Search
CPC ...................................................... G01S 19/45
See application file for complete search history.

(56) References Cited

U.S. PATENT DOCUMENTS

2018/0321680 A1* 11/2018 Tu ...................... G05D 1/0088

FOREIGN PATENT DOCUMENTS

CN 103968830 A * 8/2014
WO WO-2014145017 A2 * 9/2014 ............... B63B 3/13

OTHER PUBLICATIONS

"Coherence estimates for signals propagating through acoustic channels with multiple paths," J. Acoust. Soc. Amer., vol. 65, No. 3, pp. 622-630, Mar. 1979 (Year: 1979).*
Translation of CN 103968830 (Year: 2014).*

* cited by examiner

Primary Examiner — Jeff A Burke
Assistant Examiner — Christopher A Buksa
(74) Attorney, Agent, or Firm — Troutman Pepper Hamilton Sanders LLP; Christopher C. Close, Jr.

(57) ABSTRACT

The present invention provides a method and system for real-time high-precision positioning in the deep sea. The present invention, based on a ray theory model, uses an azimuth angle, a transmission delay, a deep-sea vehicle depth and a depth of an acoustic transducer of a water surface monitoring platform as an eigenray emergence angle, an eigenray transmission time, eigenray emergence depth and an eigenray end point depth respectively, quickly calculates an eigenray that connects the water surface monitoring platform with the deep-sea vehicle, accurately calculates a position of the deep-sea vehicle relative to the water surface monitoring platform, and converts the position into absolute position information of the deep-sea vehicle through the latitude and longitude of the water surface monitoring platform, thereby achieving real-time high-precision positioning.

8 Claims, 3 Drawing Sheets

METHOD AND SYSTEM FOR REAL-TIME HIGH-PRECISION POSITIONING IN DEEP SEA

This application claims priority to Chinese application number 201810877548.2, filed Aug. 3, 2018 with a title of METHOD AND SYSTEM FOR REAL-TIME HIGH-PRECISION POSITIONING IN DEEP SEA. The above-mentioned patent application is incorporated herein by reference in its entirety.

TECHNICAL FIELD

The present invention relates to the field of deep sea measurement, and in particular to a method and system for real-time high-precision positioning in the deep sea.

BACKGROUND

At present, a deep sea acoustic positioning system mainly consists of an ultra-short baseline (with less use of a long baseline) installed on a scientific research ship and a responder beacon installed in a deep-sea vehicle. A positioning process thereof is to locate the deep-sea vehicle by the scientific research ship, and then send a positioning result to the deep-sea vehicle via underwater acoustic communication. This positioning system and positioning mode mainly have two drawbacks: spatial references are not uniform and when the deep-sea vehicle acquires its own position information, a low update rate/large delay occurs.

In practical applications, water surface monitoring platforms (such as scientific research ships, unmanned ships, and buoys) are mainly used to monitor the position and status of the deep-sea vehicle, and do not require high status data update rates, and position information can be acquired once every 15 minutes or even longer; in contrast, the deep-sea vehicle needs to obtain its own location information more in real time when the underwater operation is performed, and the update rate should be as high as possible (for example, 1 second). Therefore, there is a need for a method and system for real-time high-precision positioning in the deep sea to solve this technical problem.

SUMMARY

An objective of the present invention is to provide a method and system for real-time high-precision positioning in the deep sea, which can improve the real-time performance and accuracy of deep sea positioning.

To achieve the above purpose, the present invention provides the following technical solutions.

In one aspect, the present invention provides a method for real-time high-precision positioning in the deep sea, where the method is applied to a device for real-time high-precision positioning in the deep sea, the device is respectively installed in a water surface monitoring platform and a deep-sea vehicle, and the positioning method includes:
  acquiring latitude and longitude and time information of the water surface monitoring platform;
  sending the latitude and longitude and time information of the water surface monitoring platform to the deep-sea vehicle in an underwater acoustic communication manner;
  decoding the communication information by the deep-sea vehicle, to acquire the latitude and longitude and time when the water surface monitoring platform transmits the communication information;
  acquiring a time when the deep-sea vehicle receives the communication information;
  obtaining a transmission delay according to the time when the water surface monitoring platform transmits the communication information and the time when the deep-sea vehicle receives the communication information;
  preliminarily estimating an azimuth angle of the water surface monitoring platform relative to the deep-sea vehicle according to a track of the deep-sea vehicle and a track of the water surface monitoring platform in a preceding period of time;
  determining a precise azimuth angle of the water surface monitoring platform relative to the deep-sea vehicle according to a communication signal received by the deep-sea vehicle and the azimuth angle;
  acquiring depth information of the deep-sea vehicle;
  determining relative position information of the deep-sea vehicle relative to the water surface monitoring platform according to the transmission delay, the precise azimuth angle and the depth information; and
  calculating absolute position information of the deep-sea vehicle according to the relative position information and the latitude and longitude information of the water surface monitoring platform.

Optionally, the latitude and longitude and time information of the water surface monitoring platform is acquired in real time through satellite positioning.

Optionally, the preliminarily estimating an azimuth angle of the water surface monitoring platform relative to the deep-sea vehicle according to a track of the deep-sea vehicle and a track of the water surface monitoring platform in a preceding period of time specifically includes:
  preliminarily estimating a relative azimuth angle between the deep-sea vehicle and the water surface monitoring platform through prior information of the track of the deep-sea vehicle and prior information of a known track of the water surface monitoring platform; and
  presetting, according to the relative azimuth angle, a beam direction of an acoustic positioning system transducer array in the deep-sea vehicle to make the beam direction point to the direction of the water surface monitoring platform.

Optionally, the determining a precise azimuth angle of the water surface monitoring platform relative to the deep-sea vehicle according to a communication signal received by the deep-sea vehicle and the azimuth angle specifically includes:
  adopting a narrow-band subspace method to process the azimuth angle according to the communication signal received by the deep-sea vehicle, to obtain a precise azimuth angle of the water surface monitoring platform relative to the deep-sea vehicle.

Optionally, the determining relative position information of the deep-sea vehicle relative to the water surface monitoring platform according to the transmission delay and the azimuth angle specifically includes:
  adopting a ray theory model and using the azimuth angle and the transmission delay as an angle of emergence and transmission time of an eigenray respectively;
  using depth information measured by a high-precision depth gauge in the deep-sea vehicle and a depth of an acoustic transducer of the water surface monitoring platform as an emergence depth and an end point depth of the eigenray respectively;
  reconstructing an eigenray according to the angle of emergence, the transmission time, the emergence depth, and the end point depth of the eigenray; and solving the eigenray to obtain the position of the deep-sea vehicle relative to the water surface monitoring platform.

In another aspect, the present invention provides a system for real-time high-precision positioning in the deep sea, including:

a first acquiring module, configured to acquire latitude and longitude and time information of the water surface monitoring platform;

an underwater acoustic communication module, configured to send the latitude and longitude and time information of the water surface monitoring platform to the deep-sea vehicle in an underwater acoustic communication manner;

a second acquiring module, configured to decode the communication information by the deep-sea vehicle, to acquire the latitude and longitude and time when the water surface monitoring platform transmits the communication information;

a third acquiring module, configured to obtain a time when the deep-sea vehicle receives the communication information;

a transmission delay determining module, configured to obtain a transmission delay according to the time when the water surface monitoring platform transmits the communication information and the time when the deep-sea vehicle receives the communication information;

an azimuth angle preliminary determining module, configured to preliminarily estimate an azimuth angle of the water surface monitoring platform relative to the deep-sea vehicle according to a track of the deep-sea vehicle and a track of the water surface monitoring platform in a preceding period of time;

an azimuth angle precise determining module, configured to determine a precise azimuth angle of the water surface monitoring platform relative to the deep-sea vehicle according to a communication signal received by the deep-sea vehicle and the azimuth angle;

a fourth acquiring module, configured to acquire depth information of the deep-sea vehicle;

a relative position information determining module, configured to determine relative position information of the deep-sea vehicle relative to the water surface monitoring platform according to the transmission delay, the precise azimuth angle and the depth information; and an absolute position information determining module, configured to calculate absolute position information of the deep-sea vehicle according to the relative position information and the latitude and longitude information of the water surface monitoring platform.

Optionally, the latitude and longitude and time information of the water surface monitoring platform is acquired in real time through satellite positioning.

Optionally, the azimuth angle preliminary determining module specifically includes:

preliminarily estimating a relative azimuth angle between the deep-sea vehicle and the water surface monitoring platform through prior information of the track of the deep-sea vehicle and prior information of a known track of the water surface monitoring platform; and presetting, according to the relative azimuth angle, a beam direction of an acoustic positioning system transducer array in the deep-sea vehicle to make the beam direction point to the direction of the water surface monitoring platform.

Optionally, the azimuth angle precise determining module specifically includes:

an azimuth angle precise determining unit, configured to adopt a narrow-band subspace method to process the azimuth angle according to the communication signal received by the deep-sea vehicle, to obtain a precise azimuth angle of the water surface monitoring platform relative to the deep-sea vehicle.

Optionally, the relative position information determining module specifically includes:

a first mapping unit, configured to adopt a ray theory model and use the azimuth angle and the transmission delay as an angle of emergence and transmission time of an eigenray respectively;

a second mapping unit, configured to use depth information measured by a high-precision depth gauge in the deep-sea vehicle and a depth of an acoustic transducer of the water surface monitoring platform as an emergence depth and an end point depth of the eigenray respectively;

a reconstruction unit, configured to reconstruct an eigenray according to the angle of emergence, the transmission time, the emergence depth, and the end point depth of the eigenray; and a solving unit, configured to solve the eigenray to obtain the position of the deep-sea vehicle relative to the water surface monitoring platform.

According to a specific embodiment provided by the present invention, the present invention discloses the following technical effects: the present invention provides a method for real-time high-precision positioning in the deep sea, which, based on a ray theory model, uses an azimuth angle, a transmission delay, a deep-sea vehicle depth and a depth of an acoustic transducer of a water surface monitoring platform as an eigenray emergence angle, an eigenray transmission time, eigenray emergence depth and an eigenray end point depth respectively, quickly calculates an eigenray that connects the water surface monitoring platform with the deep-sea vehicle, accurately calculates a position of the deep-sea vehicle relative to the water surface monitoring platform, and converts the position into absolute position information of the deep-sea vehicle through the latitude and longitude of the water surface monitoring platform, thereby achieving real-time high-precision positioning.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make objectives, features, and advantages of the present invention more comprehensible, the following describes the present invention in more detail with reference to accompanying drawings and specific implementations.

Figure 1:
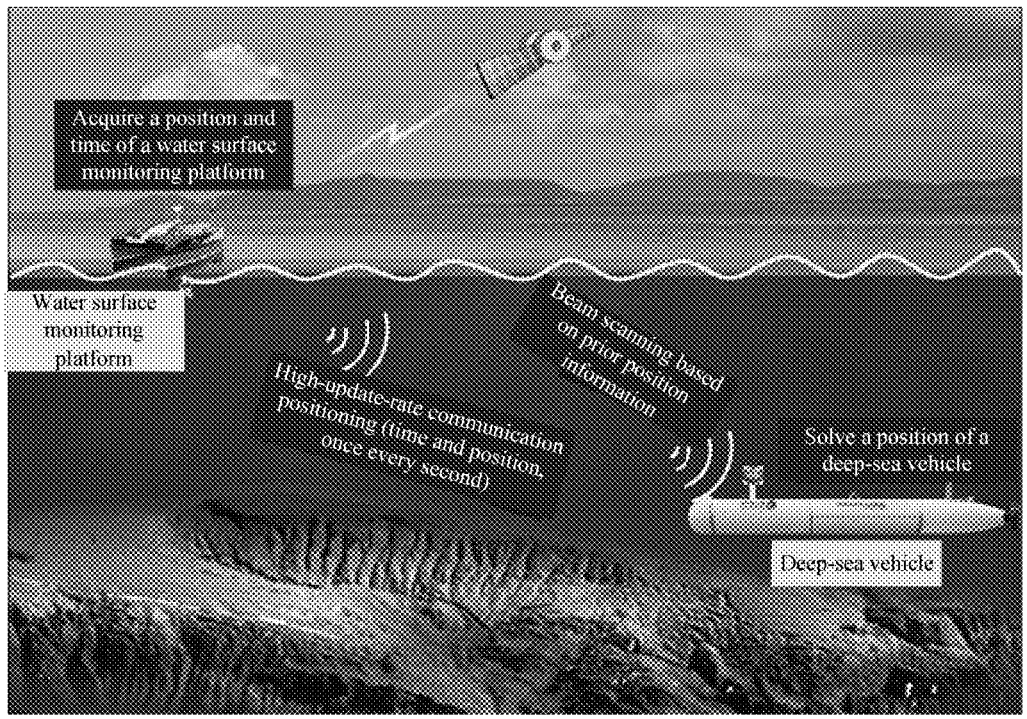
FIG. 1 is a schematic diagram of a device for real-time high-precision positioning in the deep sea according to an embodiment of the present invention.

FIG. 1 is a schematic diagram of a device for real-time high-precision positioning in the deep sea according to an embodiment of the present invention. As shown in FIG. 1, the device for real-time high-precision positioning in the deep sea is provided. The device includes a water surface monitoring platform portion and a deep-sea vehicle portion, where the water surface monitoring platform portion is mainly composed of a satellite positioning module, an acoustic transducer module, a communication signal processing module, an atomic clock, a surface layer sound velocimeter, and the like, and is mainly used for receiving satellite positioning signals, and sending its own position and time information to the deep-sea vehicle in the form of digital underwater acoustic communication. The deep-sea vehicle portion is mainly composed of an acoustic transducer array, an attitude sensor, an atomic clock, a signal processing module, a sound velocimeter, a depth gauge, and the like. The acoustic transducer array and the attitude sensor are integrated into integrated firmware and calibrated in a laboratory to avoid on-site calibration at sea. The signal processing module mainly includes a digital underwater acoustic communication signal processing unit and a positioning signal processing unit.

Figure 2:
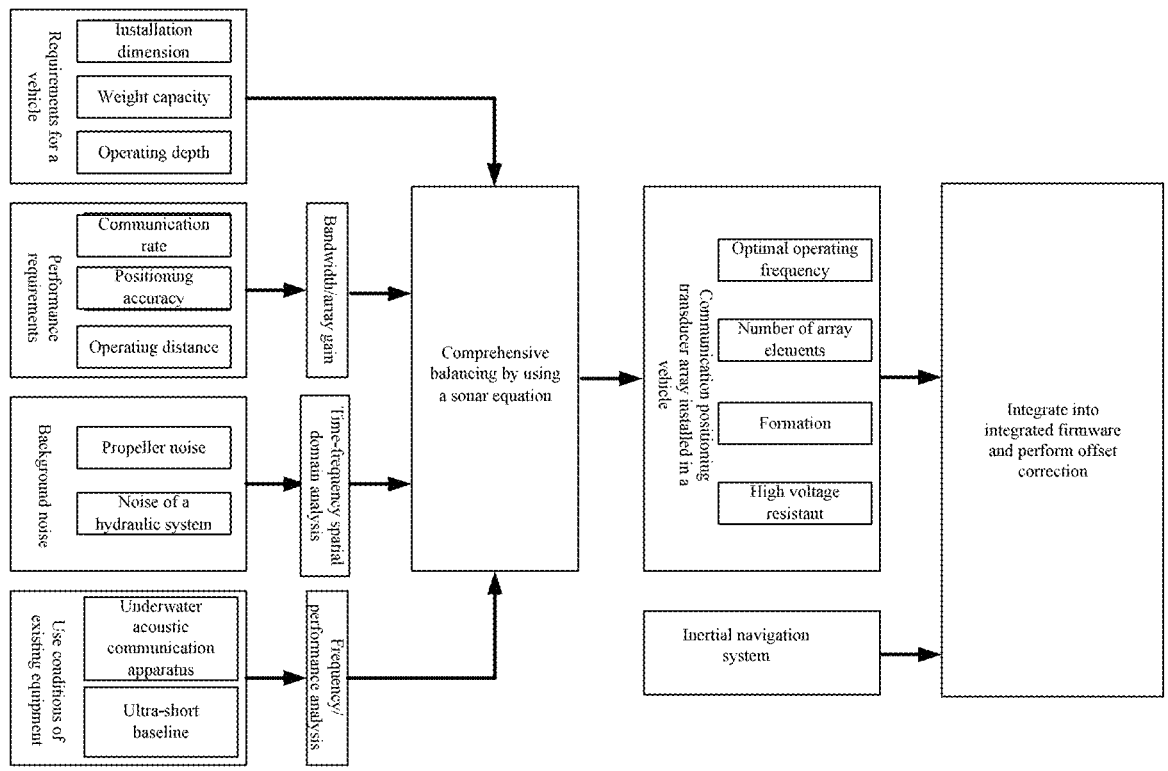
FIG. 2 is a schematic diagram of a design of a high voltage resistant transducer array and inertial navigation integration thereof according to an embodiment of the present invention.

The communication/positioning acoustic transducer array is installed in the deep-sea vehicle, the installation dimension, weight, communication rate, positioning accuracy, operating distance of the transducer array, as well as the propeller noise of the deep-sea vehicle and the noise of a hydraulic system and other factors are comprehensively considered, and each parameter is comprehensively balanced using a sonar equation and calculated repeatedly. In combination with use conditions of existing equipment, a reasonable operating frequency is selected to design a high voltage resistant transducer array that meets the communication/positioning requirements (mainly including operating frequency, the number of array elements, and formation); a conventional separate installation mode of an ultra-short baseline transducer array and an attitude sensor is changed, an inertial navigation system (which can provide high-precision attitude information) is integrated into a compressive cabin, which is deeply integrated with the preceding designed high voltage resistant transducer array into integrated firmware, and the installation position offset correction is completed in the laboratory to avoid frequent calibration in the sea during use. FIG. 2 is a schematic diagram of a design of a high voltage resistant transducer array and an inertial navigation integration thereof according to an embodiment of the present invention.

Figure 3:
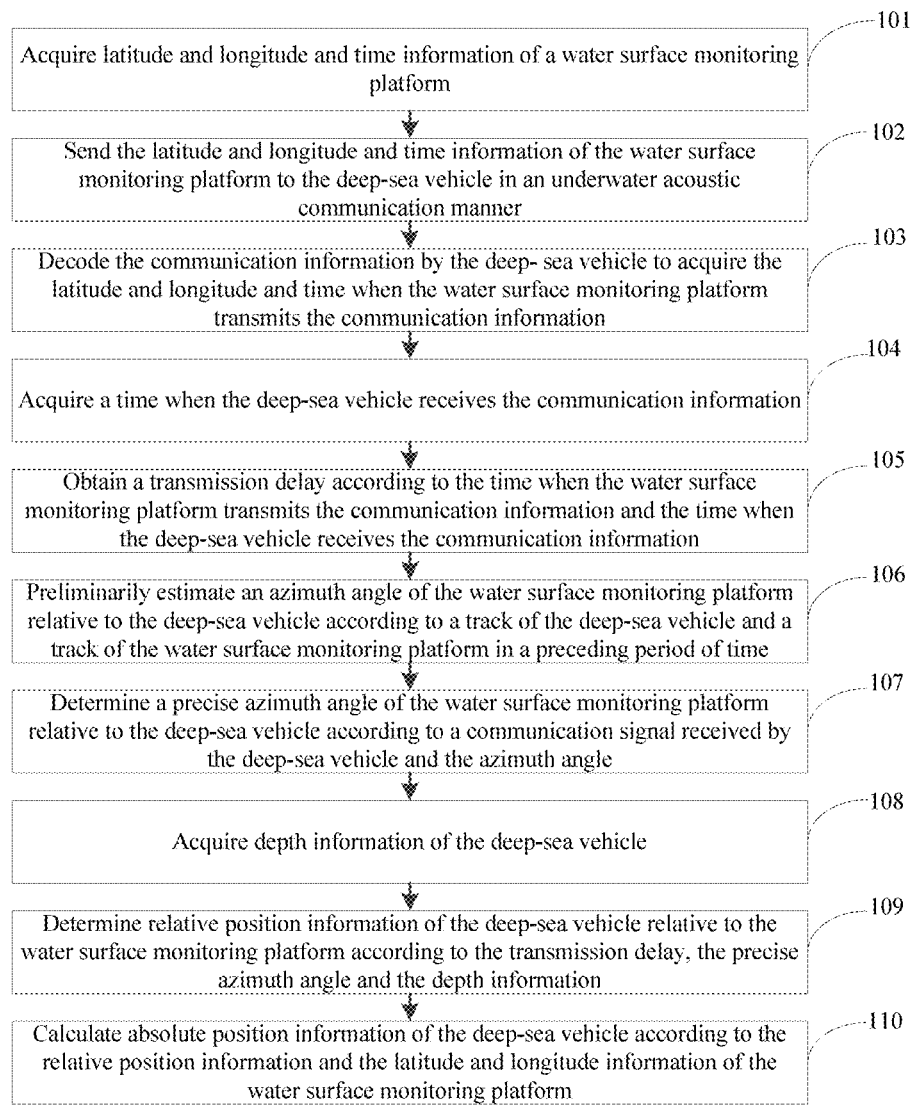
FIG. 3 is a flow chart of a method for real-time high-precision positioning in the deep sea according to an embodiment of the present invention.

FIG. 3 is a flow chart of a method for real-time high-precision positioning in the deep sea according to an embodiment of the present invention. As shown in FIG. 3, the method for real-time high-precision positioning in the deep sea is provided. The method is applied to a device for real-time high-precision positioning in the deep sea, and the positioning method includes:

Step 101: acquire latitude and longitude and time information of the water surface monitoring platform, and acquire the latitude and longitude and time information of the water surface monitoring platform in real time through satellite positioning.

Step 102: send the latitude and longitude and time information of the water surface monitoring platform to the deep-sea vehicle in an underwater acoustic communication manner; the water surface monitoring platform packages its own latitude and longitude and time information carried and instructions and the like, and sends the packet to the deep-sea vehicle through an underwater acoustic communication system at a high update rate, such as once every second; where a packet head of digital communication signals is used as a positioning pulse.

Step 103: decode the communication information by the deep-sea vehicle, to acquire the latitude and longitude and time when the water surface monitoring platform transmits the communication information.

Step 104: acquire a time when the deep-sea vehicle receives the communication information.

Step 105: obtain a transmission delay according to the time when the water surface monitoring platform transmits the communication information and the time when the deep-sea vehicle receives the communication information.

Step 106: preliminarily estimate an azimuth angle of the water surface monitoring platform relative to the deep-sea vehicle according to a track of the deep-sea vehicle and a track of the water surface monitoring platform in a preceding period of time.

Step 107: determine a precise azimuth angle of the water surface monitoring platform relative to the deep-sea vehicle according to a communication signal received by the deep-sea vehicle and the azimuth angle.

Step 108: acquire depth information of the deep-sea vehicle.

Step 109: determine relative position information of the deep-sea vehicle relative to the water surface monitoring platform according to the transmission delay, the precise azimuth angle and the depth information.

Step 110: calculate absolute position information of the deep-sea vehicle according to the relative position information and the latitude and longitude information of the water surface monitoring platform.

Step 106 specifically includes:
  preliminarily estimating a relative azimuth angle between the deep-sea vehicle and the water surface monitoring platform through prior information of the track of the deep-sea vehicle and prior information of a known track of the water surface monitoring platform; and
  presetting, according to the relative azimuth angle, a beam direction of an acoustic positioning system transducer array in the deep-sea vehicle to make the beam direction point to the direction of the water surface monitoring platform, to suppress noise of the deep-sea vehicle itself, and improve an output signal-to-noise ratio of a received signal.

Step 107 specifically includes:
adopting a narrow-band subspace method to process the azimuth angle according to the communication signal received by the deep-sea vehicle, to obtain a precise azimuth angle of the water surface monitoring platform relative to the deep-sea vehicle.

Step 109 specifically includes:
adopting a ray theory model and using the azimuth angle and the transmission delay as an angle of emergence and transmission time of an eigenray respectively;
using depth information measured by a high-precision depth gauge in the deep-sea vehicle and a depth of an acoustic transducer of the water surface monitoring platform as an emergence depth and an end point depth of the eigenray respectively;
reconstructing an eigenray according to the angle of emergence, the transmission time, the emergence depth, and the end point depth of the eigenray; and
solving the eigenray to obtain the position of the deep-sea vehicle relative to the water surface monitoring platform.

The deep-sea vehicle measures a whole sound velocity profile by using a sound velocimeter which the deep-sea vehicle carries; to compensate for the influence of sunshine and wind waves and the like on a surface sound velocity, the water surface monitoring platform measures the sound velocity profile of the sea surface within 200 m at intervals of a period of time, such as one hour, and sends a result to the deep-sea vehicle in a digital underwater acoustic communication manner, and the deep-sea vehicle fuses the sound velocity profile measured during the dive and the newly received surface sound velocity profile to obtain a new sound velocity profile that is used for eigenray solving.

According to the present invention, the acoustic transducer array and the attitude sensor are integrated into integrated firmware, and calibration is performed in the laboratory to avoid heavy on-site calibration; the acoustic positioning system is installed in the deep-sea vehicle to realize the real-time positioning of itself with a high update rate; according to the method of the present invention, by the adoption of a positioning mode in which an acoustic signal is transmitted from the water surface monitoring platform to the deep-sea vehicle in one direction, the sound production frequency of the deep-sea vehicle is reduced, and the power consumption of the system is reduced; the beam direction of the acoustic transducer array is preset through prior information such as known tracks of the deep-sea vehicle and the water surface monitoring platform, so that the output signal-to-noise ratio of the received signal is improved, and high-precision angle estimation is implemented using the coherent signal subspace processing method; based on a ray theory acoustic propagation model, the accurate estimation of the position of the deep-sea vehicle is achieved in combination with the azimuth angle, the transmission delay, the depth of the deep-sea vehicle and the depth of the acoustic transducer of the water surface monitoring platform, thereby achieving real-time and high-precision positioning of the deep-sea vehicle itself with a high update rate and low power consumption.

Figure 4:
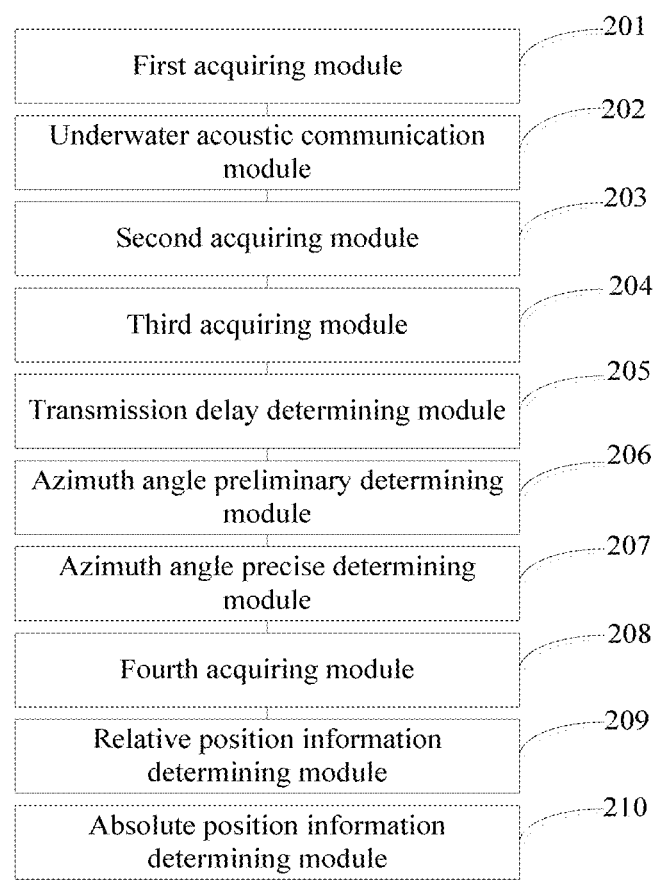
FIG. 4 is a structural diagram of a system for real-time high-precision positioning in the deep sea according to an embodiment of the present invention.

FIG. 4 is a structural diagram of a system for real-time high-precision positioning in the deep sea according to an embodiment of the present invention. As shown in FIG. 4, the system for real-time high-precision positioning in the deep sea is provided. The positioning system includes:
a first acquiring module 201, configured to acquire latitude and longitude and time information of the water surface monitoring platform, and acquire the latitude and longitude and time information of the water surface monitoring platform in real time through satellite positioning;
an underwater acoustic communication module 202, configured to send the latitude and longitude and time information of the water surface monitoring platform to the deep-sea vehicle in an underwater acoustic communication manner;
a second acquiring module 203, configured to decode the communication information by the deep-sea vehicle, to acquire the latitude and longitude and time when the water surface monitoring platform transmits the communication information;
a third acquiring module 204, configured to obtain a time when the deep-sea vehicle receives the communication information;
a transmission delay determining module 205, configured to obtain a transmission delay according to the time when the water surface monitoring platform transmits the communication information and the time when the deep-sea vehicle receives the communication information;
an azimuth angle preliminary determining module 206, configured to preliminarily estimate an azimuth angle of the water surface monitoring platform relative to the deep-sea vehicle according to a track of the deep-sea vehicle and a track of the water surface monitoring platform in a preceding period of time;
an azimuth angle precise determining module 207, configured to determine a precise azimuth angle of the water surface monitoring platform relative to the deep-sea vehicle according to a communication signal received by the deep-sea vehicle and the azimuth angle;
a fourth acquiring module 208, configured to acquire depth information of the deep-sea vehicle;
a relative position information determining module 209, configured to determine relative position information of the deep-sea vehicle relative to the water surface monitoring platform according to the transmission delay, the precise azimuth angle and the depth information; and
an absolute position information determining module 210, configured to calculate absolute position information of the deep-sea vehicle according to the relative position information and the latitude and longitude information of the water surface monitoring platform.

The azimuth angle preliminary determining module 206 specifically includes:
preliminarily estimating a relative azimuth angle between the deep-sea vehicle and the water surface monitoring platform through prior information of the track of the deep-sea vehicle and prior information of a known track of the water surface monitoring platform; and
presetting, according to the relative azimuth angle, a beam direction of an acoustic positioning system transducer array in the deep-sea vehicle to make the beam direction point to the direction of the water surface monitoring platform, to suppress noise of the deep-sea vehicle itself, and improve an output signal-to-noise ratio of a received signal.

the azimuth angle precise determining module 207 specifically includes:
an azimuth angle precise determining unit, configured to adopt a narrow-band subspace method to process the azimuth angle according to the communication signal received by the deep-sea vehicle, to obtain a precise azimuth angle of the water surface monitoring platform relative to the deep-sea vehicle.

The relative position information determining module 209 specifically includes:
 a first mapping unit, configured to adopt a ray theory model and use the azimuth angle and the transmission delay as an angle of emergence and transmission time of an eigenray respectively;
 a second mapping unit, configured to use depth information measured by a high-precision depth gauge in the deep-sea vehicle and a depth of an acoustic transducer of the water surface monitoring platform as an emergence depth and an end point depth of the eigenray respectively;
 a reconstruction unit, configured to reconstruct an eigenray according to the angle of emergence, the transmission time, the emergence depth, and the end point depth of the eigenray; and
 a solving unit, configured to solve the eigenray to obtain the position of the deep-sea vehicle relative to the water surface monitoring platform.

The deep-sea vehicle measures a whole sound velocity profile in a sound velocimeter which the deep-sea vehicle carries; to compensate for the influence of sunshine and wind waves and the like on a surface sound speed, the water surface monitoring platform measures the sound velocity profile of the sea surface within 200 m at intervals of a period of time, such as one hour, and sends a result to the deep-sea vehicle in a digital underwater acoustic communication manner, and the deep-sea vehicle fuses the sound velocity profile measured during the dive and the newly received surface sound velocity profile to obtain a new sound velocity profile that is used for eigenray solving.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A method for real-time high-precision positioning in the deep sea, wherein the method is applied to a device for real-time high-precision positioning in the deep sea, the device is respectively installed in a water surface monitoring platform and a deep-sea vehicle, and the positioning method comprises:
 acquiring latitude and longitude and time information of the water surface monitoring platform;
 sending the latitude and longitude and time information of the water surface monitoring platform to the deep-sea vehicle in an underwater acoustic communication manner;
 decoding the communication information by the deep-sea vehicle, to acquire the latitude and longitude and time when the water surface monitoring platform transmits the communication information;
 acquiring a time when the deep-sea vehicle receives the communication information;
 obtaining a transmission delay according to the time when the water surface monitoring platform transmits the communication information and the time when the deep-sea vehicle receives the communication information;
 preliminarily estimating an azimuth angle of the water surface monitoring platform relative to the deep-sea vehicle according to a track of the deep-sea vehicle and a track of the water surface monitoring platform in a preceding period of time;
 determining a precise azimuth angle of the water surface monitoring platform relative to the deep-sea vehicle according to a communication signal received by the deep-sea vehicle and the azimuth angle;
 acquiring depth information of the deep-sea vehicle;
 determining relative position information of the deep-sea vehicle relative to the water surface monitoring platform according to the transmission delay, the precise azimuth angle and the depth information, comprises:
  adopting a ray theory model and using the azimuth angle and the transmission delay as an angle of emergence and transmission time of an eigenray respectively;
  using depth information measured by a high-precision depth gauge in the deep-sea vehicle and a depth of an acoustic transducer of the water surface monitoring platform as an emergence depth and an end point depth of the eigenray respectively;
  reconstructing an eigenray according to the angle of emergence, the transmission time, the emergence depth, and the end point depth of the eigenray; and
  solving the eigenray to obtain the position of the deep-sea vehicle relative to the water surface monitoring platform; and
 calculating absolute position information of the deep-sea vehicle according to the relative position information and the latitude and longitude information of the water surface monitoring platform.

2. The method for real-time high-precision positioning in the deep sea according to claim 1, wherein the latitude and longitude and time information of the water surface monitoring platform is acquired in real time through satellite positioning.

3. The method for real-time high-precision positioning in the deep sea according to claim 1, wherein the preliminarily estimating an azimuth angle of the water surface monitoring platform relative to the deep-sea vehicle according to a track of the deep-sea vehicle and a track of the water surface monitoring platform in a preceding period of time specifically comprises:
 preliminarily estimating a relative azimuth angle between the deep-sea vehicle and the water surface monitoring platform through prior information of the track of the deep-sea vehicle and prior information of a known track of the water surface monitoring platform; and
 presetting, according to the relative azimuth angle, a beam direction of an acoustic positioning system transducer array in the deep-sea vehicle to make the beam direction point to the direction of the water surface monitoring platform.

4. The method for real-time high-precision positioning in the deep sea according to claim 1, wherein the determining a precise azimuth angle of the water surface monitoring platform relative to the deep-sea vehicle according to a communication signal received by the deep-sea vehicle and the azimuth angle specifically comprises:

adopting a narrow-band subspace method to process the azimuth angle according to the communication signal received by the deep-sea vehicle, to obtain a precise azimuth angle of the water surface monitoring platform relative to the deep-sea vehicle.

5. A system for real-time high-precision positioning in the deep sea, comprising:

a first acquiring module, configured to acquire latitude and longitude and time information of the water surface monitoring platform;

an underwater acoustic communication module, configured to send the latitude and longitude and time information of the water surface monitoring platform to the deep-sea vehicle in an underwater acoustic communication manner;

a second acquiring module, configured to decode the communication information by the deep-sea vehicle, to acquire the latitude and longitude and time when the water surface monitoring platform transmits the communication information;

a third acquiring module, configured to obtain a time when the deep-sea vehicle receives the communication information;

a transmission delay determining module, configured to obtain a transmission delay according to the time when the water surface monitoring platform transmits the communication information and the time when the deep-sea vehicle receives the communication information;

an azimuth angle preliminary determining module, configured to preliminarily estimate an azimuth angle of the water surface monitoring platform relative to the deep-sea vehicle according to a track of the deep-sea vehicle and a track of the water surface monitoring platform in a preceding period of time;

an azimuth angle precise determining module, configured to determine a precise azimuth angle of the water surface monitoring platform relative to the deep-sea vehicle according to a communication signal received by the deep-sea vehicle and the azimuth angle;

a fourth acquiring module, configured to acquire depth information of the deep-sea vehicle;

a relative position information determining module, configured to determine relative position information of the deep-sea vehicle relative to the water surface monitoring platform according to the transmission delay, the precise azimuth angle and the depth information, wherein the relative position information determining module specifically comprises:

a first mapping unit, configured to adopt a ray theory model and use the azimuth angle and the transmission delay as an angle of emergence and transmission time of an eigenray respectively;

a second mapping unit, configured to use depth information measured by a high-precision depth gauge in the deep-sea vehicle and a depth of an acoustic transducer of the water surface monitoring platform as an emergence depth and an end point depth of the eigenray respectively;

a reconstruction unit, configured to reconstruct an eigenray according to the angle of emergence, the transmission time, the emergence depth, and the end point depth of the eigenray; and a solving unit, configured to solve the eigenray to obtain the position of the deep-sea vehicle relative to the water surface monitoring platform; and an absolute position information determining module, configured to calculate absolute position information of the deep-sea vehicle according to the relative position information and the latitude and longitude information of the water surface monitoring platform.

6. The system for real-time high-precision positioning in the deep sea according to claim 5, wherein the latitude and longitude and time information of the water surface monitoring platform is acquired in real time through satellite positioning.

7. The system for real-time high-precision positioning in the deep sea according to claim 5, wherein the azimuth angle preliminary determining module specifically comprises:

preliminarily estimating a relative azimuth angle between the deep-sea vehicle and the water surface monitoring platform through prior information of the track of the deep-sea vehicle and prior information of a known track of the water surface monitoring platform; and presetting, according to the relative azimuth angle, a beam direction of an acoustic positioning system transducer array in the deep-sea vehicle to make the beam direction point to the direction of the water surface monitoring platform.

8. The system for real-time high-precision positioning in the deep sea according to claim 5, wherein the azimuth angle precise determining module specifically comprises:

an azimuth angle precise determining unit, configured to adopt a narrow-band subspace method to process the azimuth angle according to the communication signal received by the deep-sea vehicle, to obtain a precise azimuth angle of the water surface monitoring platform relative to the deep-sea vehicle.

* * * * *